G. D. POGUE.
PRESSURE PRODUCING APPARATUS.
APPLICATION FILED NOV. 7, 1917.

1,290,662.

Patented Jan. 7, 1919.
2 SHEETS—SHEET 1.

Inventor,
George D. Pogue.
By Bakewell & Church Attys.

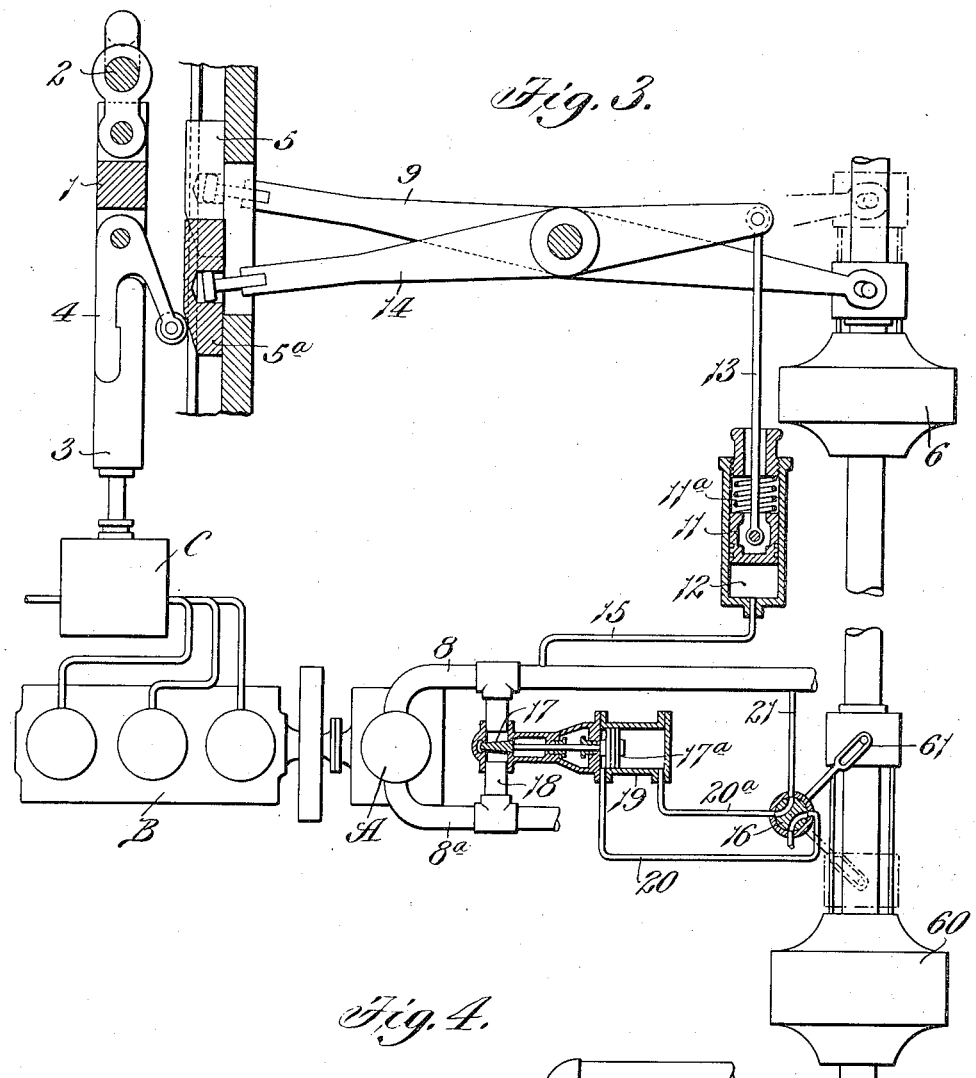
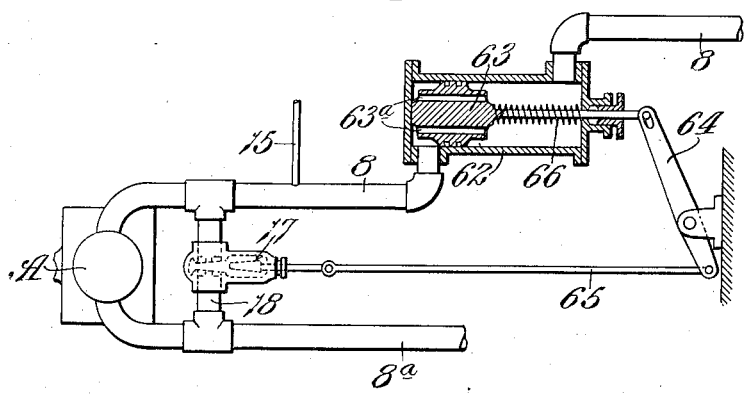

UNITED STATES PATENT OFFICE.

GEORGE D. POGUE, OF ST. LOUIS, MISSOURI.

PRESSURE-PRODUCING APPARATUS.

1,290,662.      Specification of Letters Patent.      Patented Jan. 7, 1919.

Original application filed October 25, 1915, Serial No. 57,857. Divided and this application filed November 7, 1917. Serial No. 200,720.

*To all whom it may concern:*

Be it known that I, GEORGE D. POGUE, a citizen of the United States, residing at St. Louis, Missouri, have invented a certain new and useful Improvement in Pressure-Producing Apparatus, of which the following is a full, clear, and exact description, such as will enable others skilled in the art to which it appertains to make and use the same.

This invention relates primarily to heavy oil internal combustion engines of the type in which fuel oil in measured quantities is supplied to the cylinder or cylinders of the engine.

In a large proportion of all municipal water works pumping plants the pumps discharge water directly into the mains, instead of into stand pipes or elevated supply tanks. In such plants or water supply systems it is, of course, necessary to vary the speed of the pump and the prime mover that operates the pump to correspond to the continually varying requirements for water. Heretofore Diesel engines and other heavy oil internal combustion engines have not been available for water works systems which were not provided with stand pipes or elevated supply tanks, owing to the fact that the various existing forms of fuel pumps and governors for oil engines are designed to maintain approximately constant engine speed, even under wide variations of load. Nor can Diesel engines and similar oil engines equipped with the existing forms of fuel pumps and governors be used successfully for driving an air compressor in an air supplying system in which the pressure must be held approximately constant while the quantity of air demanded is subject to wide variations.

In my pending application Serial No. 57,857, filed October 25, 1915, of which this present application is a division, I have described and claimed a variable feed fuel pump which is so constructed that the speed of a Diesel or other type of internal combustion engine can be so controlled that the quantity of liquid discharged from the compressor or pump driven by the engine will be automatically proportional to the demand at all times, thereby enabling the pressure on the discharge line to be maintained approximately constant.

The main object of my present invention is to provide an apparatus of the general type previously mentioned, wherein constant pressure is maintained on the discharge pipe under wide variations in demand.

Another object is to provide a pumping or pressure-producing apparatus that comprises a pump or compressor, an internal combustion engine for driving same, a speed controlling means for the engine that is governed by the medium on which the pump or compressor acts and means for preventing said speed controlling means causing the engine to slow down to such a degree that there is a possibility of the engine stopping.

Other objects and desirable features of my invention will be hereinafter pointed out.

Figure 1 of the drawings is a diagrammatic view, illustrating my invention embodied in a pumping or pressure-producing apparatus.

Fig. 3 is a diagrammatic view, illustrating a modification of my invention; and

Fig. 4 is a detail view, partly in section, illustrating still another form of my invention.

Figure 1:
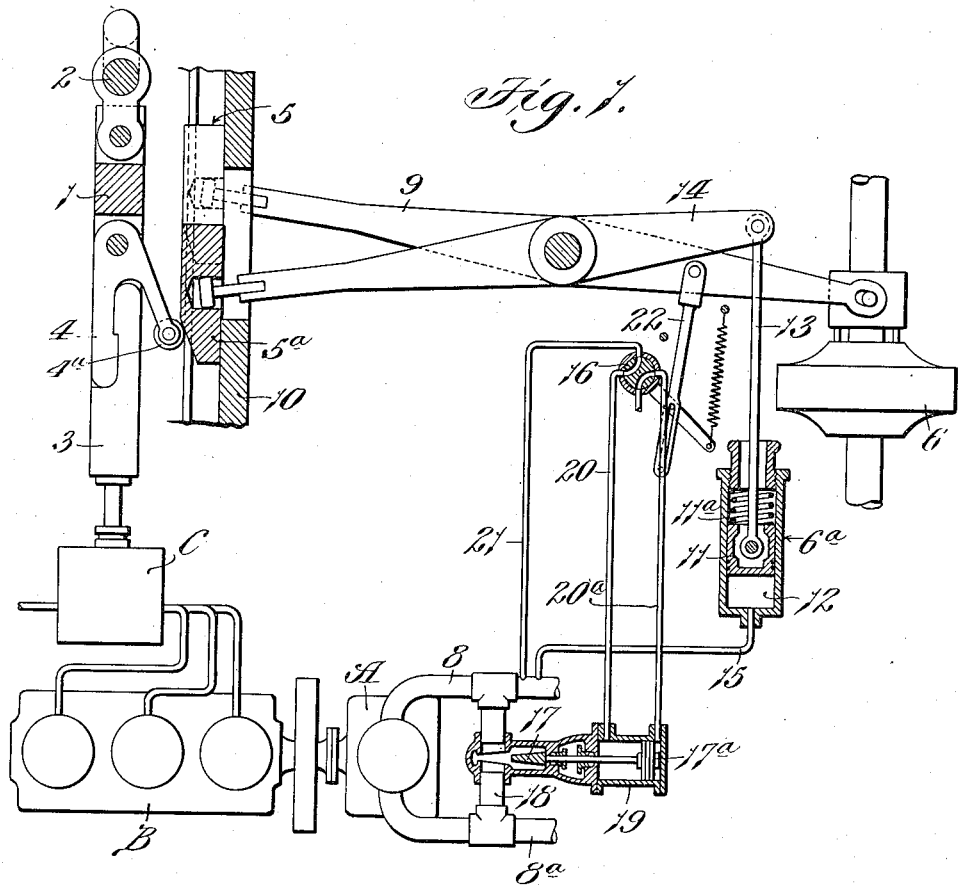
Figure 2:
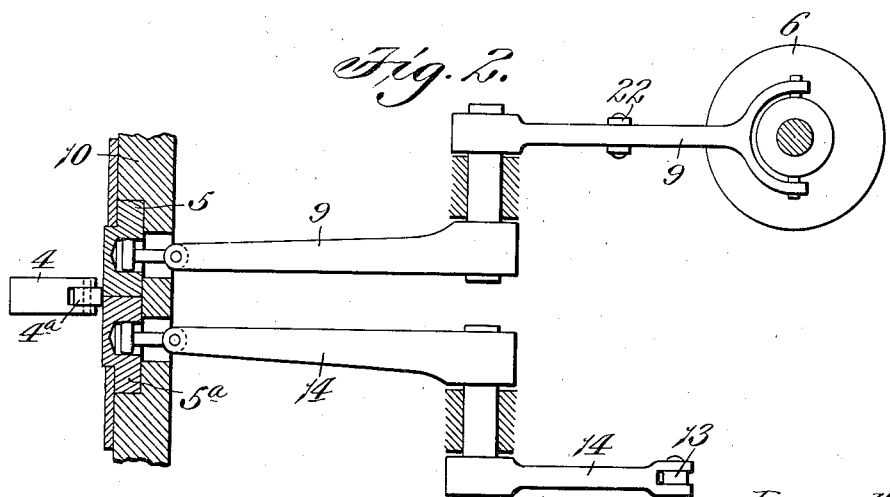
Fig. 2 is a top plan view, partly in horizontal section, of certain parts of the apparatus shown in Fig. 1.

Referring to Fig. 1 of the drawings, which illustrates an apparatus embodying my invention, A designates a pump or compressor. B designates a heavy oil internal combustion engine that drives said pump and C designates the fuel pump that supplies oil in measured quantities to the cylinders of the engine B. Said fuel pump C is of the general type disclosed in my prior Patents No. 1,154,723, dated September 28, 1915, and No. 1,203,259, dated October 31, 1916, and the plunger-operating mechanism of same consists of a fixed-stroke actuating member 1 that is operated by any suitable means, such, for example, as a crank shaft 2 driven by the engine B, a variable-stroke member 3 connected to the pump plunger and a connecting element 4 that transmits movement from the fixed-stroke member 1 to the variable-stroke member 3, when the plunger operating mechanism moves in one direction, preferably during the suction stroke of the pump plunger. The position of the connecting element 4 with relation to the variable-stroke member 3 which it moves is controlled by a mechanism of novel construction that consists of two separate and distinct tripping devices 5 and 5ª which are under the control of two separate and distinct means. In the apparatus herein shown the means that governs the tripping device 5 consists of the speed-actuated governor 6 of the engine B, and the means that governs the tripping device 5ᵃ consists of a device 6ᵃ that is governed by the pressure in the discharge line that leads from the pump A. It is immaterial, however, so far as my broad idea is concerned, what means is employed for governing the position of the tripping devices 5 and 5ᵃ, so long as said means cause said tripping devices to operate independently of each other. Furthermore, while I have herein illustrated my invention embodied in an apparatus in which the supply of fuel oil to the prime mover is governed by a variable feed pump whose plunger-operating mechanism comprises a connecting element that coöperates with a plurality of tripping devices, each of which is under the control of a separate and distinct governing means, I wish it to be understood that my invention is applicable to any kind of variable feed pump which is of such design that the supply from same can be controlled by separate and distinct means.

In the fuel pump C of the apparatus herein shown the connecting element 4 of the plunger-operating mechanism couples the variable-stroke member 3 to the fixed-stroke actuating member 1, during more or less of the suction stroke of the pump plunger, according to the position of the tripping devices 5 and 5ᵃ. Under normal conditions the connecting element 4 will serve to couple the variable-stroke member 3 to the actuating member 1 until said actuating member reaches some point between the beginning and the end of its suction stroke, at which time a roll 4ᵃ on the connecting element 4 engages the tripping device 5, which causes the element 4 to be tripped or rendered inoperative, so that the variable-stroke member 3 will remain at rest during the completion of the suction stroke of the actuating member 1. The tripping device 5 is connected by some suitable means with the collar of the speed-actuated governor 6, as, for example, by means of a lever 9, and in practice said tripping device 5 regulates the maximum speed of the engine B and holds the speed within certain predetermined limits, the movement of the collar of the governor 6 being transmitted to the tripping device 5 by means of the lever 9, so as to automatically change the position of said tripping device, and thus cause the pump C to supply more or less fuel to the cylinders of the engine B, according to the speed of said engine. The tripping device 5ᵃ is utilized to govern the speed of the engine B under abnormal conditions, as, for example, when the consumption from the discharge pipe 8 of the variable capacity pump or compressor A is below normal. The tripping devices 5 and 5ᵃ herein shown consist of blocks that are slidably mounted in a guideway 10 and which are so arranged that the roll 4ᵃ on the connecting element 4 can engage either of said tripping devices, each of said tripping devices having an inclined surface $x$ that merges into a flat surface $y$ arranged parallel to the path of movement of the members 1 and 3 of the plunger-operating mechanism and so positioned with relation to said parts that the connecting element 4 will be held out of engagement with the variable-stroke member 3 when said roll 4ᵃ is on the flat surface $y$ of either of the tripping devices 5 and 5ᵃ. The device 6ᵃ that governs the tripping device 5ᵃ may consist of a piston 11 arranged in a cylinder 12 and connected by means of a link 13 and a lever 14 with the tripping device 5ᵃ. A pipe 15 that leads from the lower end of the cylinder 12 to the discharge line 8 from the variable capacity pump or compressor A establishes communication between said cylinder and discharge pipe, and thus causes the piston 11 to be under the influence or direct control of the pressure in the discharge pipe 8. Said piston 11 is acted upon by a spring 11ᵃ which normally holds the piston at the lower end of the cylinder 12, thereby causing the tripping device 5ᵃ to be held in such a position that it will not be engaged by the roll 4ᵃ of the connecting element 4 of the plunger-operating mechanism under normal conditions. Whenever the pressure in the discharge pipe 8 starts to build up, due to a reduction in the consumption of the medium that flows through the discharge pipe, the piston 11 starts to move upwardly, as shown in Fig. 1, and consequently, moves the tripping device 5ᵃ into operative position with relation to the connecting element of the plunger-operating mechanism of the fuel pump C, thereby automatically reducing the supply of oil from the fuel pump, and consequently, diminishing the speed of the engine B and the pump A which said engine drives. From the foregoing it will be seen that in an apparatus of the construction above described the speed of the engine B that operates the pump or compressor A diminishes gradually as the consumption from the discharge line 8 decreases, owing to the fact that the supply of fuel from the pump C is reduced automatically, as the position of the tripping device 5ᵃ is changed, by the upward movement of the piston 11 of the pressure-operated controlling device 6ᵃ. When the pressure in the discharge pipe 8 falls the tripping device 5ᵃ starts to move upwardly, and thus causes the supply of fuel oil from the pump C to increase automatically, thereby causing the engine B to operate at such a speed that the pump A will supply the demand on the discharge pipe 8. If the consumption from the discharge pipe 8 is normal, or practically so, the tripping device 5ª will remain in an inoperative condition and the supply of fuel from the pump C will be regulated by the tripping device 5, which is under the control of the speed-actuated governor 6 of the engine B.

In order to prevent the pressure-operated controlling device 6ª from moving the tripping device 5ª into such a position that the fuel pump C will not supply oil to the engine B, the apparatus is constructed in such a manner that when the engine B slows down to a certain speed, due to an abnormal rise in pressure in the discharge line 8, means will operate automatically to relieve the pressure in the discharge line 8, and thus prevent the pressure-operating controlling device 6ª from moving the tripping device 5ª into such a position that there is liability of the engine stopping, due to loss of sufficient fly wheel effect for compression. In the apparatus shown in Fig. 1 this is effected by a valve 16 that is combined with the speed-controlled governor 6 in such a manner that said valve 16 will change its position automatically when the engine B slows down to a certain speed, and will open a valve 17 in a by-pass 18 that extends from the inlet 8ª to the discharge line 8 of the pump A. The valve 17 is connected to a piston 17ª, which is arranged in a cylinder 19, as shown in Fig. 1, the opposite ends of said cylinder 19 being connected by means of pipes 20 and 20ª with the casing of the valve 16, which is a four-way valve. A supply pipe 21 that leads from the discharge line 8 to the valve casing of the valve 16 causes pressure to be exerted on the piston 17ª, so as to hold the valve 17 open when the valve 16 is in the position shown in Fig. 1. When said valve 16 is moved into its other extreme position, the pressure is admitted to the opposite end of the cylinder 19 through the pipe 20ª, thereby causing the piston 17ª to move and close the valve 17. The valve 16 is connected by means of a link 22 to the lever 9, which is under the influence of the collar of the speed-actuated governor 6, and consequently, when said governor collar moves downwardly, due to an abnormal reduction in the speed of the engine B, the valve 17 will open, and thus prevent any further rise in pressure in the discharge line 8, or, in other words, will prevent the pressure in the discharge line rising sufficiently to cause the piston 11 in the cylinder 12 to move the tripping device 5ª into such a position that the fuel pump C will not supply oil to the engine B. When the speed of the engine builds up, the governor collar will move upwardly and will thus cause the valve 17 in the by-pass 18 to be restored to its normal closed position. If desired, the valve 16 may be controlled by an independent speed governor, separate and distinct from the governor 6, the governor 6 being utilized to control the maximum speed of the engine and the other speed governor being utilized to open the by-pass valve 17 when the speed of the engine drops to a predetermined point. In Fig. 3 of the drawings I have illustrated an apparatus constructed in the manner just referred to, the reference character 60 designating an independent speed governor whose movable collar is operatively connected with an arm 61 on the stem of the valve 16. Whenever the pressure in the discharge pipe 8 reaches such a degree that the speed of the engine is reduced to a point where it would be liable to stop, due to loss of sufficient fly wheel effect for compression, the collar of the speed governor 60 moves downwardly from its normal position shown in full lines in Fig. 3 into the position shown in broken lines in said figure, and thus turns the valve 16 into such a position that the by-pass valve 17 will move into its open position. As soon as the demand for the medium in the pipe 8 increases, the speed of the engine will increase and thus cause the collar of the speed governor 60 to move upwardly, thereby causing the by-pass valve 17 to be restored to its closed position. Instead of using a valve 16 and piston 17ª for controlling the by-pass valve 17, said by-pass valve can be controlled by a piston in the discharge pipe 8 which is so constructed that it will hold the valve 17 closed so long as the rate of flow in the discharge pipe is normal, or approximately so. In such a structure, illustrated in Fig. 4, the discharge pipe 8 is provided with a cylinder 62 in which a piston 63 is arranged, said piston being operatively connected with the by-pass valve 17 by means of a lever 64 and a link 65. The piston 63 is provided with an orifice or orifices 63ª, through which all of the liquid or fluid in the pipe 8 is compelled to pass. These orifices set up a differential in pressure which causes the piston 63 to move in the direction of the discharge, and thus hold the by-pass valve 17 closed. Whenever the rate of flow through the pipe 8 is reduced, a spring 66 operates to open the by-pass valve 17, and thus prevents the pressure from rising to such a degree that the controlling device 5ª will cause the speed of the engine to be reduced to a point where it would be liable to stop, due to loss of sufficient fly wheel effect for compression. Thereafter, when the demand on the system is resumed and the rate of flow through the pipe 8 becomes normal, or practically so, the piston 63 closes the by-pass valve 17. Instead of by-passing the liquid or fluid around the pump A, said pump can be provided with a waste pipe controlled by the valve 17.

While I have herein illustrated my invention embodied in an apparatus that comprises a device governed by the pressure in the discharge line from the pump A for controlling the speed of the engine that drives said pump, my invention is not limited to an apparatus of this particular type, but is applicable to an apparatus in which a pump is employed for pumping a liquid into a reservoir or container. In such an apparatus the speed of the engine could be accurately controlled by a device governed by the level of the liquid in the reservoir, and a waste valve could be combined with the speed-actuated governor of the engine in such a manner that the level of the liquid in the reservoir would never rise high enough to cause the supply of fuel from the pump C to cease. Therefore, wherever I have used the term "means controlled by the medium which the pump or compressor acts on," I mean to include an apparatus of the particular construction herein illustrated, wherein the speed of the engine is controlled by a device governed by the pressure in the discharge line, or an apparatus of the type in which the speed of the engine is controlled by a device governed by the level of the liquid in a reservoir connected with the discharge side of the pump A.

Having thus described my invention, what I claim, and desire to secure by Letters Patent, is:

1. In an apparatus of the character described, the combination of a pump or compressor, an internal combustion engine of the heavy oil type for driving same, a fuel pump for supplying fuel to the engine, a device governed by the medium that the pump acts on for controlling the operation of said fuel pump so as to regulate the speed of the engine, and means for preventing said device from causing the engine to stop.

2. In an apparatus of the character described, the combination of a pump or compressor, an internal combustion engine of the heavy oil type for driving same, a fuel pump for supplying fuel to the engine, a speed-controlled governor for controlling the maximum speed of the engine, a device governed by the medium that the pump acts on for controlling the operation of said fuel pump so as to regulate the speed of the engine, and means controlled by said governor for preventing said device from causing the engine to stop.

3. In an apparatus of the character described, the combination of a variable capacity pump or compressor, an internal combustion engine of the heavy oil type for driving same, a fuel pump for supplying fuel to the engine, a governor for regulating the maximum speed of the engine, a device governed by the pressure in the discharge line of the pump or compressor for controlling the operation of said fuel pump so as to regulate the speed of the engine, and means for preventing the pressure in the discharge line from becoming great enough to cause said device to stop the engine.

4. In an apparatus of the character described, the combination of a pump or compressor, an internal combustion engine of the heavy oil type for driving same, a fuel pump for supplying oil to the engine, a governor for regulating the supply of oil from the pump at maximum speeds of the engine, an independent device governed by the pressure in the discharge line from the variable capacity pump or compressor for regulating the supply of oil from said fuel pump, and means for preventing said pressure-operated device from causing the supply of oil from said fuel pump to become diminished to such an extent that there is liability of the engine stopping, due to loss of sufficient fly wheel effect for compression.

5. In an apparatus of the character described, the combination of a pump or compressor, an internal combustion engine of the heavy oil type for driving same, a variable feed pump for supplying fuel oil to said engine, a speed-controlled governor that controls the supply of oil from said fuel pump, an independent device governed by the pressure in the discharge line from the pump or compressor for regulating the supply of oil from the fuel pump, and means under the influence of the governor that prevents the pressure in the discharge line from rising sufficiently to cause said pressure-operated device to render the fuel pump inoperative.

GEORGE D. POGUE.